United States Patent
Kwon et al.

(10) Patent No.: US 8,629,852 B2
(45) Date of Patent: Jan. 14, 2014

(54) TOUCH SCREEN AND METHOD FOR COMPENSATING SENSING CAPACITANCE VARIATIONS AND OFFSET VARIATIONS THEREOF

(75) Inventors: Oh-Kyong Kwon, Seoul (KR); Jang Hyun Park, Seoul (KR); Yea Chul Roh, Seongnam (KR); Chang Sun Kim, Seoul (KR)

(73) Assignees: Electronics and Telecommunications Research Institute, Daejeon (KR); Industry-University Cooperation Foundation Hanyang Univ., Seoul (KR)

( * ) Notice: Subject to any disclaimer, the term of this patent is extended or adjusted under 35 U.S.C. 154(b) by 625 days.

(21) Appl. No.: 12/878,338

(22) Filed: Sep. 9, 2010

(65) Prior Publication Data

US 2011/0109585 A1    May 12, 2011

(30) Foreign Application Priority Data

Nov. 12, 2009  (KR) .................. 10-2009-0108956
Apr. 7, 2010   (KR) .................. 10-2010-0031831

(51) Int. Cl.
*G06F 3/045*  (2006.01)
*G06F 3/041*  (2006.01)

(52) U.S. Cl.
USPC ........................................ 345/174; 345/178

(58) Field of Classification Search
USPC .......................................... 345/173, 174, 178
See application file for complete search history.

(56) References Cited

U.S. PATENT DOCUMENTS

| 7,567,240 B2 | 7/2009 | Peterson, Jr. et al. |
| 7,692,638 B2 * | 4/2010 | Land et al. .................. 345/173 |
| 2007/0257890 A1 * | 11/2007 | Hotelling et al. ............ 345/173 |

FOREIGN PATENT DOCUMENTS

| KR | 10-2009-0017557 A | 2/2009 |
| KR | 10-1233479 B1 | 2/2013 |

OTHER PUBLICATIONS

Oh-Kyong Kwon et al., "Small-Area and High-Accuracy Calibration Technique for Sensing Capacitor in the Touch Screen Panel", 11th Symposium on Information Display (ASID'09), Oct. 7, 2009, pp. 1-4.

* cited by examiner

*Primary Examiner* — Michael Faragalla

(57) ABSTRACT

Provided are a touch screen and a method for compensating sensing capacitance variations and offset variations thereof. The touch screen includes: a touch panel where a plurality of driving lines and a plurality of sensing lines intersect and are wired; a driving unit for activating the driving lines sequentially; an input unit for measuring a sensing capacitance formed in a sensing line corresponding to an activated driving line; a multiplexer for serializing and outputting the measured sensing capacitance; an analog-to-digital converter for sampling the sensing capacitance outputted from the multiplexer by reflecting an initial sensing capacitance as an offset and performing analog-to-digital conversion for the sampling result; and a host processor for determining a touch event in response to the analog-to-digital conversion result.

20 Claims, 10 Drawing Sheets

TOUCH SCREEN AND METHOD FOR COMPENSATING SENSING CAPACITANCE VARIATIONS AND OFFSET VARIATIONS THEREOF

CROSS-REFERENCE TO RELATED APPLICATIONS

This U.S. non-provisional patent application claims priority under 35 U.S.C. §119 of Korean Patent Application Nos. 10-2009-0108956, filed on Nov. 12, 2009, and 10-2010-0031831, filed on Apr. 7, 2010, the entire contents of which are hereby incorporated by reference.

BACKGROUND OF THE INVENTION

The present invention'disclosed herein relates to a touch screen, and more particularly, to a device and a method for compensating sensing capacitance variations of a touch panel and compensating offset variations of a charge amplifier in an input unit of a controller in order to reduce sensing errors.

A touch screen is one of the most popular human-machine interfaces. The touch screen is used for a variety of applications such as Automated Teller Machines (ATMs), laptop Personal Computers (PCs), and mobile devices. The touch screen may execute different functions easier by touching or moving a cursor on a screen without external input devices such as keyboard and a mouse. Due to these characteristics, the touch screen is recognized as more effective interface in terms of convenience, flexibility, and cost, compared to a keyboard, a mouse, or a key panel exclusive solution.

A touch event of the touch screen may be sensed through various methods. For example, a touch event of the touch screen may be sensed through resistive, infrared, infrared image, surface acoustic wave (SAW), acoustic pulse recognition (APR), and capacitive sensing methods.

Among them, the capacitive sensing method may be classified into a projected sensing method and a surface capacitive sensing method. The projected capacitive sensing method receives great attentions because it may recognize multi-touch events.

However, the projected capacitive sensing method may cause sensing errors because of sensing capacitance variations of a touch panel and offset variations of a charge amplifier in an input unit of a controller. The sensing capacitance variations, and offset variations of the input unit of the controller may originate from manufacturing process variations of sensing capacitors. Therefore, in order to reduce sensing errors and accurately sensing a touch event on a touch screen, solutions for compensating the sensing capacitance variations and the offset variations are required.

SUMMARY OF THE INVENTION

The present invention provides a device and a method for compensating variations of a sensing capacitance and offset variations of an input unit of a controller, caused from a manufacturing process of a touch panel.

The present invention also provides a device and a method for reducing sensing errors of a touch screen and accurately sensing a touch event with a smaller chip size than an existing controller.

Embodiments of the present invention provide a touch screen including: a touch panel where a plurality of driving lines and a plurality of sensing lines intersect and are wired; a driving unit for activating the driving lines sequentially; an input unit for measuring a sensing capacitance formed in a sensing line corresponding to an activated driving line; a multiplexer for serializing and outputting the measured sensing capacitance; an analog-to-digital converter for sampling the sensing capacitance outputted from the multiplexer by reflecting an initial sensing capacitance as an offset and performing analog-to-digital conversion for the sampling result; and a host processor for determining a touch event in response to the analog-to-digital conversion result.

In some embodiments, the analog-to-digital conversion result may correspond to a difference between the sensing capacitance and the initial sensing capacitance.

In other embodiments, the initial sensing capacitance may be measured when the touch panel is not touched.

In still other embodiments, the analog-to-digital converter may include: a first switch for providing the sensing capacitance outputted from the multiplexer into the capacitor array at a sampling phase; a capacitor array for sampling the sensing capacitance at the sampling phase after a plurality of capacitors are selectively connected to a ground or a first reference voltage by the initial sensing capacitance; a Successive Approximation Register (SAR) logic for controlling to provide the initial sensing capacitance to the capacitor array and output a sampling result of the capacitor by a bit unit at a digital conversion phase; a comparator for outputting digital data of a bit unit by receiving the sampling result by a bit unit at the digital conversion phase; and a second switch for providing the sampling result to the capacitor array to the comparator at the digital conversion phase.

In even other embodiments, the capacitor array may sample a voltage corresponding to a difference between a second reference voltage and a compensation voltage.

In yet other embodiments, when the second reference voltage is VREF and bits of the initial sensing capacitance are COMP1, COMP2, ..., COMP10, respectively, the compensation voltage $V_{COMP}$ may have a value as follows.

$$V_{COMP} = V_{REF}\left(\frac{1}{2}COMP_1 + \frac{1}{2^2}COMP_2 + \ldots + \frac{1}{2^{10}}COMP_{10}\right)$$

In further embodiments, the host processor may include a memory for storing the initial sensing capacitance and the initial sensing capacitance may be provided from the memory to the capacitor array before the sampling phase begins.

In still further embodiments, the input unit may include a plurality of charge amplifiers for converting the measured sensing capacitance into a voltage and each of the plurality of charge amplifiers may include at least one feedback capacitor.

In even further embodiments, in order to adjust gains of the plurality of charge amplifiers, the feedback capacitor may constitute a programmable capacitor array to compensate variation of a sensing capacitance by a control of the host processor.

In yet further embodiments, in order to compensate offset variations of the plurality of charge amplifiers, further including an offset digital-to-analog converter for adjusting a level of a reference voltage of the analog-to-digital converter by a control of the host processor.

In other embodiments of the present invention, a compensating method for sensing capacitance variations and offset variations of a touch screen, include storing first data measured from a sensing capacitor when the touch screen is not touched; and converting second data measured from the sensing capacitor into digital data when the touch panel is touched, wherein the first data are used to adjust a level of a sampling voltage about the second data when the second data are converted into the digital data.

In some embodiments, the converting the second data into the digital data may include: selectively connecting a plurality of capacitors of a capacitor array to a ground or a first reference voltage, based on the first data; sampling the second data in the capacitor array; and converting the sampling result to N-bit digital data.

In other embodiments, the converting the N-bit digital data may include: sequentially generating N scan signals corresponding to bits of the N-bit digital data, respectively; sequentially inputting voltages corresponding to the bits of the N-bit digital data, respectively, among the sampling result into a comparator; and determining each of the bits of the N bit digital data by comparing a voltage inputted into the comparator with a second reference voltage.

In still other embodiments, the sampling result may be inputted into an inverting input of the comparator.

In even other embodiments, the N bit digital data determined by the comparator may correspond to a difference between the first data and the second data.

In yet other embodiments, the capacitor array may sample a voltage corresponding to a difference between a second reference voltage and a compensation voltage.

In further embodiments, when the second reference voltage is VREF and bits of the initial sensing capacitance are COMP1, COMP2, . . . , COMP10, respectively, the compensation voltage $V_{COMP}$ may have a value as follows.

$$V_{COMP} = V_{REF}\left(\frac{1}{2}COMP_1 + \frac{1}{2^2}COMP_2 + \ldots + \frac{1}{2^{10}}COMP_{10}\right)$$

In still further embodiments, a level of the compensation voltage may be adjusted according to the first data value.

In even further embodiments, the storing of the first data may be performed when an initial operation, in which the touch panel is driven for the first time, is performed or environment is changed.

In even further embodiments, before the converting the second data into the digital data, further including compensating for an offset of a charge amplifier for measuring the second data from the sensing capacitor, wherein the charge amplifier includes a programmable feedback capacitor.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

A touch screen and its sensing capacitance variations compensating method may store an initial value of a sensing capacitance (hereinafter, referred to as a initial sensing capacitance $C_{INI}$) in a memory during a set up initial condition phase, in order to compensate sensing capacitance variations of a touch screen, which originates from manufacturing processes. Moreover, by using an initial sensing capacitance stored in the memory as an offset, sensing capacitance variations inputted during a touch sensing and compensation phase are to be invalidated.

Figure 1:
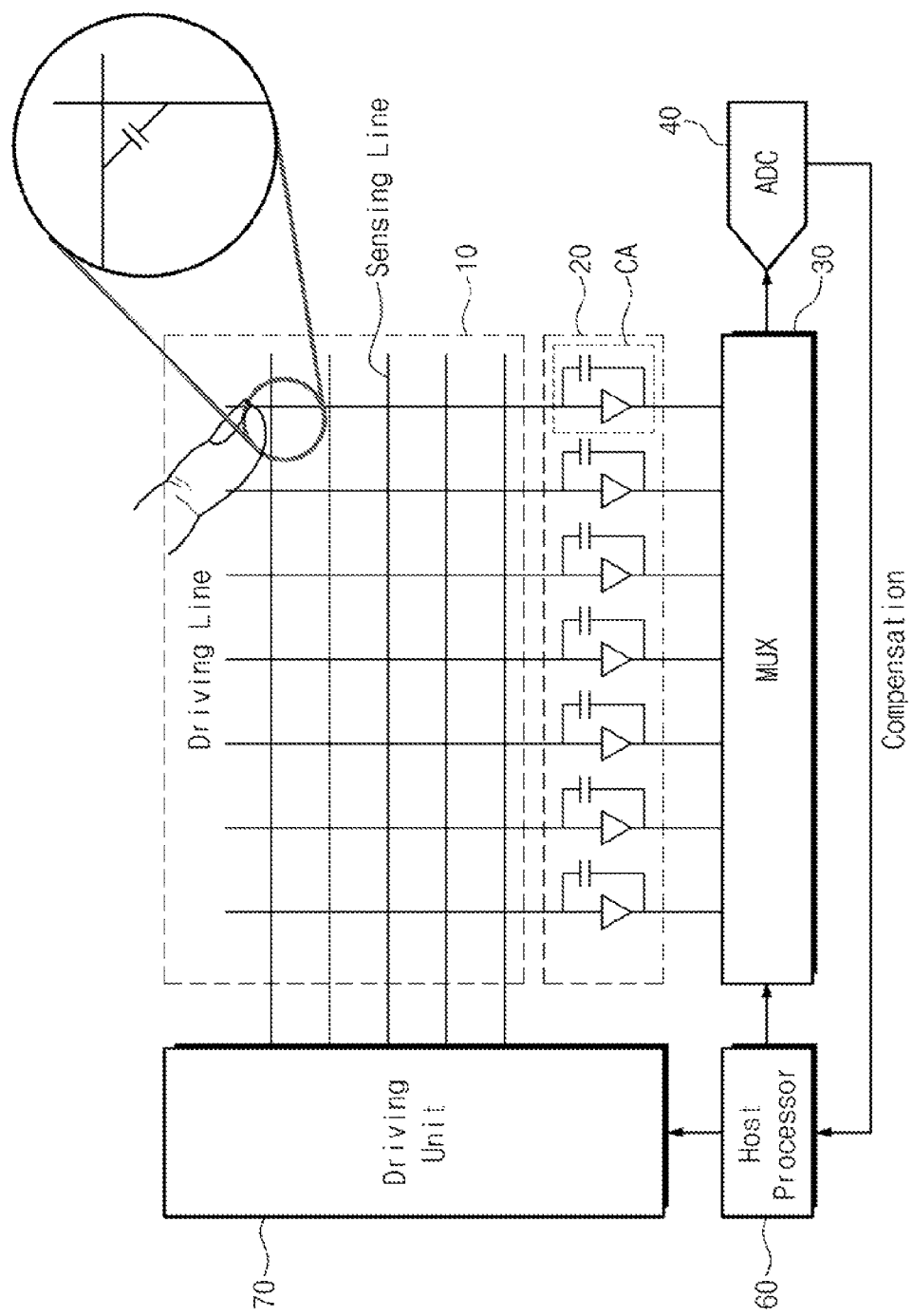
FIG. 1 is a view illustrating an entire structure of a touch screen according to the present invention.

FIG. 1 is a view illustrating an entire structure of a touch screen.

Referring to FIG. 1, the touch screen includes a touch panel 10, an input unit 20, a multiplexer (MUX) 30, an analog-to-digital convertor (ADC) 40, a host processor 60, and a driving unit 70. The input unit 20, the MUX 30, the ADC 40, the host processor, and the driving unit 70 may constitute a controller.

The touch panel 10 includes a projected capacitive touch panel and may sense a touch event through a projected capacitive sensing method. The touch panel 10 may have a matrix structure where a plurality of driving lines and a plurality of sensing lines intersect and are aligned. The driving lines may be disposed in a row direction on the touch panel 10 and the sensing lines may be disposed in a column direction on the touch panel 10. The driving lines and sensing lines may be patterned in respectively different layers and also may be manufactured with a structure separated by a transparent dielectric layer.

A capacitor may be formed at an intersection point of each driving line and each sensing line, that is, where patterned two layers overlap each other. A capacitance of the capacitor is called a sensing capacitance $C_{SENSE}$. When a conductible object such as a finger approaches the touch panel 10, a size of a corresponding sensing capacitance $C_{SENSE}$ may change. Accordingly, which position a touch event occurs may be recognized by sensing a size change of the sensing capacitance $C_{SENSE}$.

The driving lines of the touch panel 10 are connected to the driving unit 70 such that excitation scan signals may sequentially be applied from the driving unit 70. The driving unit 70 may also be called as an excitation IC or a driving IC.

The excitation scan signal applied to each driving line may be coupled to a corresponding sensing line through the sensing capacitance $C_{SENSE}$. The input unit 20 may include a plurality of charge amplifiers (CAs). The plurality of CAs may form an array. Moreover, each charge amplifier CA may be connected to each sensing line.

If the sensing capacitance $C_{SENSE}$ changes in each sensing line, an amount to be coupled is changed such that an output value of the CA is changed. The CA senses the sensing capacitance $C_{SENSE}$. of a corresponding sensing line and outputs the sensed sending capacitance $C_{SENSE}$ to the MUX 30. The MUX 30 sequentially transmits output voltages of the plurality of CAs to the ADC 40 (for example, in a serial signal form).

In case that a driving line is activated and a panel is not touched, all outputs of the CAs should represent the same voltage. However, because of sensing capacitance variations originating from manufacturing processes of a touch screen panel, outputs of the CAs may have respectively different values in each sensing line. As a result, because of the sensing capacitance variations caused from manufacturing processes of a panel, the output values of the CAs become different even if the panel is not touched. Consequently, sensing errors may occur. To resolve this problem, the ADC 40 of the present invention compensates for variations of the sensing capacitance $C_{SENSE}$ originating from manufacturing processes to prevent sensing errors.

That is, the ADC 40 may compensate variations of the sensing capacitance $C_{SENSE}$ originating from manufacturing processes in response to compensation data provided from the host processor 60 when converting the sensing capacitance $C_{SENSE}$ into digital values. Therefore, as shown in FIG. 1, data of a digital form, which are outputted from the ADC 40 to the host processor 60, do not include the variations of the sensing capacitance $C_{SENSE}$. Although it may be described in detail below, a variation compensation operation of the sensing capacitance $C_{SENSE}$ may be performed by itself without an additional calculation circuit such as an adding unit or a subtracting unit.

The host processor 60 receives data, for which the manufacturing process variations are compensated, from the ADC 40 and performs image processing. For this, the host processor 60 may include an image processing filter or an image filter. Moreover, the host processor 60 may perform interpolation on a sensing result of a digital form. Here, the interpolation may be performed by referring to a resolution of the touch screen. Besides that, the host processor 60 may perform a function for controlling general operations of the touch screen.

Furthermore, the host processor 60 provides compensation data to the CA of the input unit 20, such that offset variations (for example, offset variations of the CA) of an input unit of a controller, which originate from manufacturing processes, may be compensated. Here, the compensation data provided to the input unit 20 may be configured to be identical to the compensation data provided to the ADC 40 and may be adjusted to another value to be fit for operation characteristics of the input unit 20. Detailed configuration and operation characteristics of the input unit 20 will be described below in detail with reference to FIG. 2.

Figure 2:
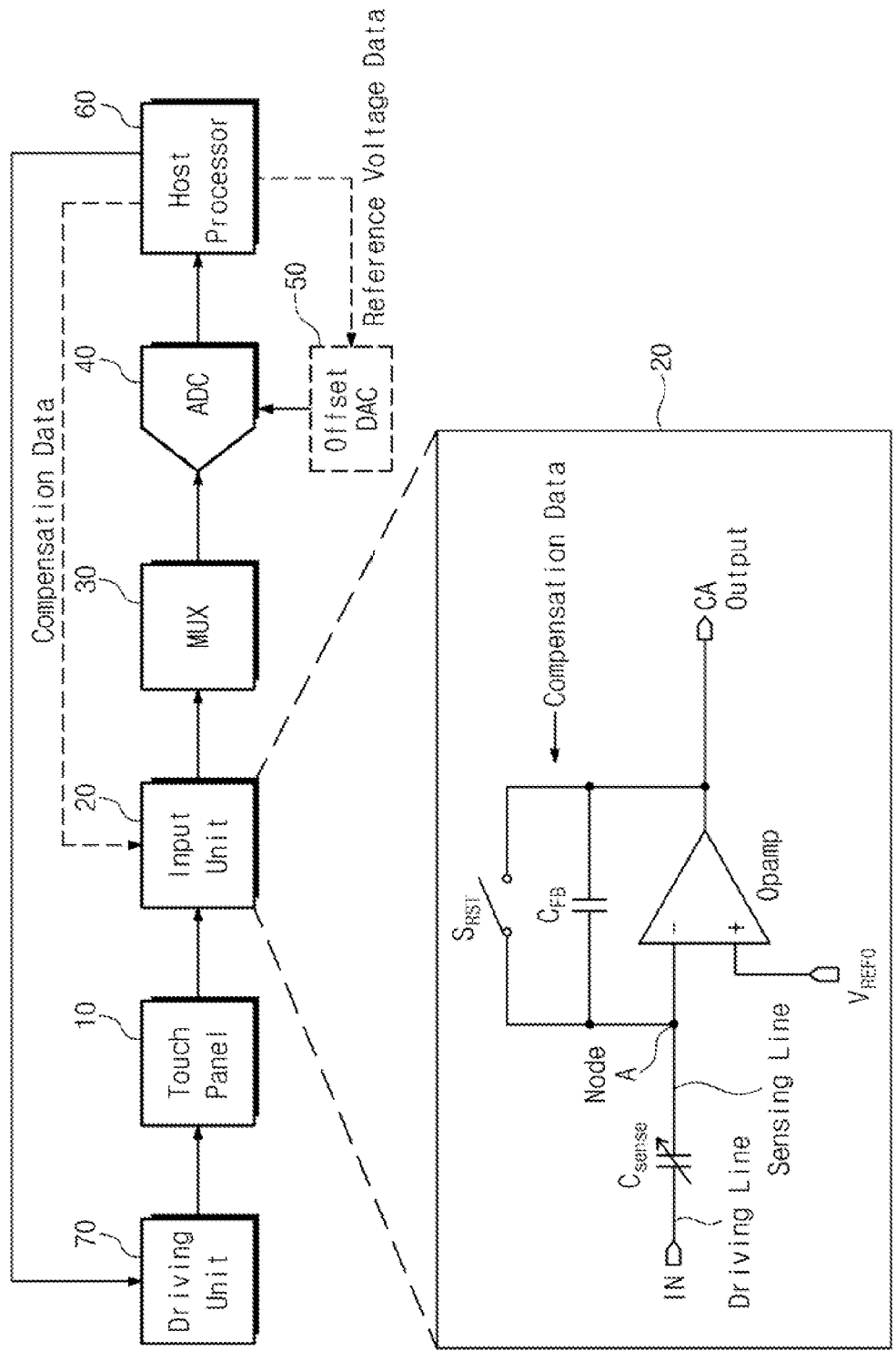
FIG. 2 is a view illustrating a detailed configuration of the input unit of FIG. 1.

FIG. 2 is a view illustrating a detailed configuration of the input unit 20 of FIG. 1. Detailed configuration about one of the plurality of CAs in the input unit 20 is illustrated in FIG. 2.

Referring to FIG. 2, the CA may include an operation amplifier OP-amp. A feedback capacitor $C_{FB}$ may be connected between an inverting input (−) and an output terminal of the CA. Charge-to-voltage conversion of the CA may be performed by the feedback capacitor $C_{FB}$. Additionally, a reset switch $S_{RST}$ is connected in parallel to the feedback capacitor $C_{FB}$ to reset the CA. For example, if the reset switch $S_{RST}$ is turned on (that is, close), an inverting input (−) of the CA may be reset to a reference voltage $V_{REF0}$.

In one embodiment, the CA may include a single feedback capacitor $C_{FB}$ as shown in FIG. 2. According to this configuration of the present invention, without a gain controllable charge amplifier (that uses a programmable capacity array as a feedback capacitor to compensate variations of a touch panel sensing capacitance) in the input unit of the controller, variations of the sensing capacitance and also entire offset variations of the input unit of the controller may be compensated for only with the ADC 40. Accordingly, a circuit are may be reduced. Here, offset variations of the input unit of the controller, which are compensated, may mean the offset variations of the CA and entire input offsets of the controller including the input unit 20, the MUX 30, the ADC 40, the host processor 60, and the driving unit 70.

In another embodiment, the CA of the present invention may include a programmable capacitor array instead of a single feedback capacitor $C_{FB}$. In this case, a capacitor value of the programmable capacitor array in the CA may be adjustable using compensation data provided from the host processor 60. Moreover, as a value of a programmable capacitor array is adjusted, gain of the CA may be adjusted according thereto. According to this configuration, while the sensing capacitor variations are compensated by adjusting gains of the CA, entire offset variations of an input of a controller may be compensated by the ADC 40.

In another embodiment, the touch screen of the present invention may further include an offset Digital-to-Analog Converter (DAC) 50 that adjusts a level of a reference voltage $V_{REF1}$ of the ADC 40. The used reference voltage compensation data may be provided from the host 60. According to this configuration, while the sensing capacitance variations and the reference voltage $V_{REF1}$ of the ADC 40 are adjusted by the input unit 20 and the offset DAC 50, entire offset variations of the input unit of the controller may be compensated by the ADC 40. Accordingly, more accurate compensation for errors and variations may become possible.

In the present invention, a case that a single feedback capacitor $C_{FB}$ is included in the CA will be illustrated. However, this is just one example applied to the present invention, and thus configuration of the feedback capacitor of the CA may vary in different forms. Additionally, according to the form of a controller, whether the offset DAC 50 will be equipped or not may be determined.

The CA may be connected to a corresponding sensing line through a node A. The sensing line may be wired in a. column direction on the touch panel 10. The inverting input (−) of an operation amplifier is connected to a node A and a corresponding sensing line may be connected to the node A. As shown in FIG. 1, the plurality of driving lines may intersect and may be wired to the sensing lines, respectively. A sensing capacitance $C_{SENSE}$ may be formed between a sensing line and a driving line. A parasite capacitance may exist around the sensing capacitance $C_{SENSE}$. The parasite capacitance is the entire sum of capacitances of the sensing lines and may mean entire capacitances of the sensing lines. In a preferred embodiment, the CA may be configured to minimize an entire parasite capacitance during a sensing operation.

A reference voltage $V_{REF0}$ may be inputted to the non-inverting input (+) of the CA. In this case, the inverting input (−) of the CA may operate substantially as a virtual ground. An output voltage $V_{OUT}$ (indicated as CA Output in FIG. 2) may be expressed as the following [Equation 1].

$$V_{OUT} = V_{REF0} - \frac{C_{SIG}}{C_{FB}} \times V_{EX} \qquad \text{[Equation 1]}$$

where $V_{EX}$ is an excitation signal voltage applied to a driving line and a feedback capacitor $C_{FB}$.

As shown in [Equation 1], an output voltage $V_{OUT}$ of the CA may be configured regardless of an entire parasite capacitance. Accordingly, during a sensing operation of the CA, influence due to a parasite capacitance may be removed. For example, if the size of the feedback capacitor $C_{FB}$ is adjusted according to [Equation 1], a gain of the CA predicted from an output of the CA may change. Accordingly, it is guaranteed that the CA operates stably within a dynamic range of the CA.

The size of the feedback capacitor $C_{FB}$ may be adjusted in response to compensation data provided from the host processor 60. As a result, a gain of the CA predicted from an output of the CA is changed, such that offset variations (for example, offset variations of CA) of an input unit of a controller, which originate from manufacturing processes, may be compensated. Here, the compensation data provided to the input unit 20 may be configured to be identical to the compensation data provided to the ADC 40 and may be adjusted with another value to fit for operation characteristics of the input unit 20

Especially, the CA of the present invention may compensate offset variations by using only its single feedback capacitor $C_{FB}$ while performing gain adjustment and offset compensation. Accordingly, the CA has a smaller size than a Successive Approximation Register (SAR)-ADC with a serial capacitor DAC.

For example, a programmable capacitor array used as a feedback capacitor in a gain controllable charge amplifier increases its size by two times each time the number of bits of a digital value to be programmed is increased by one. Thus, it occupies more space than before. Unlike this, since a CA using a single feedback capacitor is used instead of a gain adjustable CA, its area may be reduced greatly according to the present invention. Accordingly, the CA of the present invention may occupy a less chip area, reduce sensing errors of a touch screen, and more accurately sense a touch event.

Figure 3:
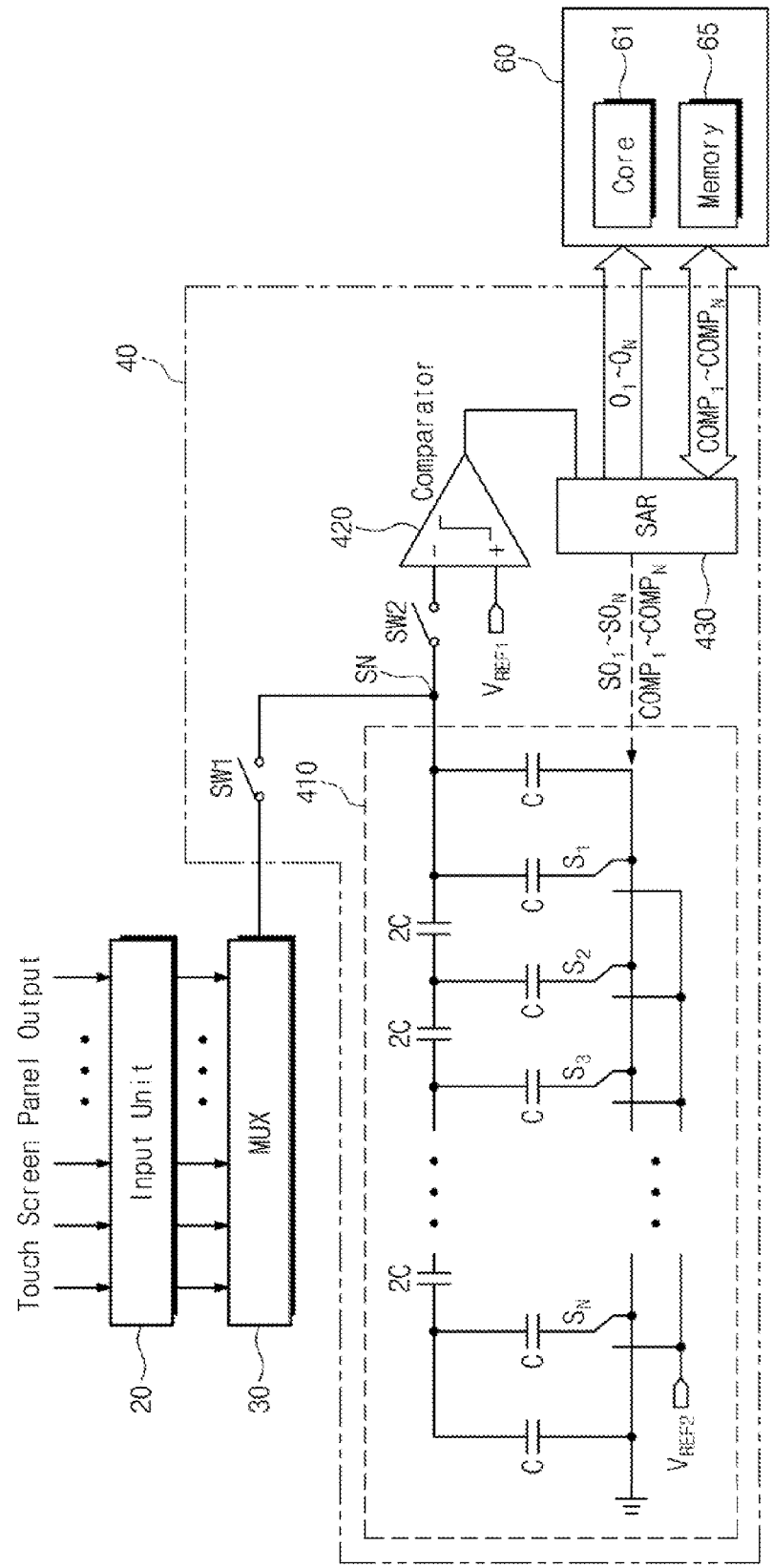
FIG. 3 is a view illustrating a detailed configuration of the ADC of FIG. 1.

FIG. 3 is a view illustrating a detailed configuration of the ADC 40 of FIG. 1.

Referring to FIGS. 1 through 3, the input unit 20 may include a plurality of CAs connected to a plurality of sensing lines. Each CA senses a sensing capacitance $C_{SENSE}$ of a corresponding sensing line and outputs it to the MUX 30.

The host processor 60 may be configured to include a core 61 and a memory 65. The core 61 receives a sensing result of a digital form provided from the ADC 40 and may perform image processing and/or interpolation on the sensing result. According to the image processing and/or interpolation result of the core 61, touch events and gestures may be determined.

A measured result of an initial sensing capacitance $C_{INI}$ may be stored in the memory 65 as digital data of a bit form. The measured result of the initial sensing capacitance $C_{INI}$ stored in the memory 65 may be used as compensation data $COMP_1$ to $COMP_N$ to compensate variations caused from manufacturing processes of the sensing capacitors. For example, the measured result of the initial sensing capacitance $C_{INI}$ may be defined as a compensation voltage $V_{COMP}$, and bit values of the compensation voltage $V_{COMP}$ may be defined as $COMP_1$ to $COMP_N$. Below, for convenience of description, the measured result of the initial sensing capacitance $C_{INI}$ may be described as the compensation data $COMP_1$ to $COMP_N$.

The compensation data $COMP_1$ to $COMP_N$ stored in the memory 65 are provided to the ADC 40 to be reflected on sampling and data conversion with respect to values of the currently measured sensing capacitance $C_{SENSE}$, such that variations of the sensing capacitance $C_{SENSE}$ caused from manufacturing processes may be compensated.

The ADC 40 may include a first switch SW1, a second switch SW2, a capacitor array 410, a comparator 420, and a SAR logic 430. Here, it is described that the first switch SW1 and the second switch SW2 are included in the ADC 40 for convenience of description. However, this is just one configuration example, and thus forms and configurations of the first and second switches SW1 and SW2 may not limited to specific forms and may vary. For example, the first and second switches SW1 and SW2 may be included in the ADC 40 and may be separately placed outside the ADC 40.

An output of the MUX 30 may be connected to the sampling node SN of the ADC 40 by the first switch SW1. A capacitor array 410 including a plurality of capacitors may be connected to the sampling node SN. The capacitor array 410 may be configured to be programmable. The capacitor array 410 may constitute an N-bit C-2C DAC. In this case, the capacitor array 410 may have a capacitor array structure of C-2C. An output of the capacitor array 410 may be used as a sampling capacitance $C_s$.

In a preferred embodiment, the capacitor array 410 may include a plurality of first type capacitors C connected in parallel to the sampling node SN. Charge switches S1 to SN may be connected to first type capacitors. According to switching operations of the charge switches $S_1$ to $S_N$, a ground voltage or a reference voltage $V_{REF2}$ may be selectively connected to the first type capacitor. In a preferred embodiment, each first type capacitor may sequentially correspond to the most significant bit (MSB) to the least significant bit (LSB) of a plurality of bits. For example, the first type capacitor connected to the first charge switch S I may correspond to the MSB among the N-bit digital data. Also, the first type capacitor connected to the N charge switch $S_N$ may correspond to the LSB among the N-bit digital data.

The second type capacitor 2C may be connected between adjacent first type capacitors. The second type capacitor may be configured not to be connected between capacitors corresponding to the MSB and LSB among a plurality of first type capacitors connected in parallel and adjacent capacitors. Here, a form of the capacitor array 410 is not limited to a specific form and may vary. In addition, connection forms and capacitances of the first and second type capacitors C and 2C are not limited to a specific form and capacitance and may vary.

A capacitance (i.e., sampling capacitance Cs) provided from the capacitor array 410 to the sampling node SN may be determined by on/off operations of the charge switches S1 to SN connected to the capacitor array 410. The on/off operations of the charge switches SI to SN may be controlled by scan signals $SO_1$ to $SO_N$ provided from the SAR logic 430 and the compensation data $COMP_1$ to $COMP_N$ stored in the memory 65. For example, during a sampling operation of the ADC 40, the on/off operations of the charge switches $S_1$ to $S_N$ may be controlled by the compensation data $COMP_1$ to $COMP_N$ stored in the memory 65. Moreover, during a data conversion operation of the ADC 40, the on/off operation of the charge switches S1 to SN may be controlled by the scan signals $SO_1$ to $SO_N$ provided from the SAR logic 430. The ADC 40 may generate digital data bits $b_1$ to $b_N$ of an N bit as an analog-to-digital conversion result and this may be provided to the host processor 60 as output signals $O_1$ to $O_{10}$ of the SAR logic 430.

If a resolution of the ADC 40 is an N-bit, the ADC 40 requires time of total N frames during a compensation operation. However, since the ADC 40 of the present invention requires only one frame time about initial excitation when a compensation operation begins, an initial operation time is drastically reduced. Moreover, as the ADC 40 of the present invention is configured with a SAR-ADC using an N-bit C-2C DAC, the touch screen of the present invention has a high resolution and a small area.

Figure 4:
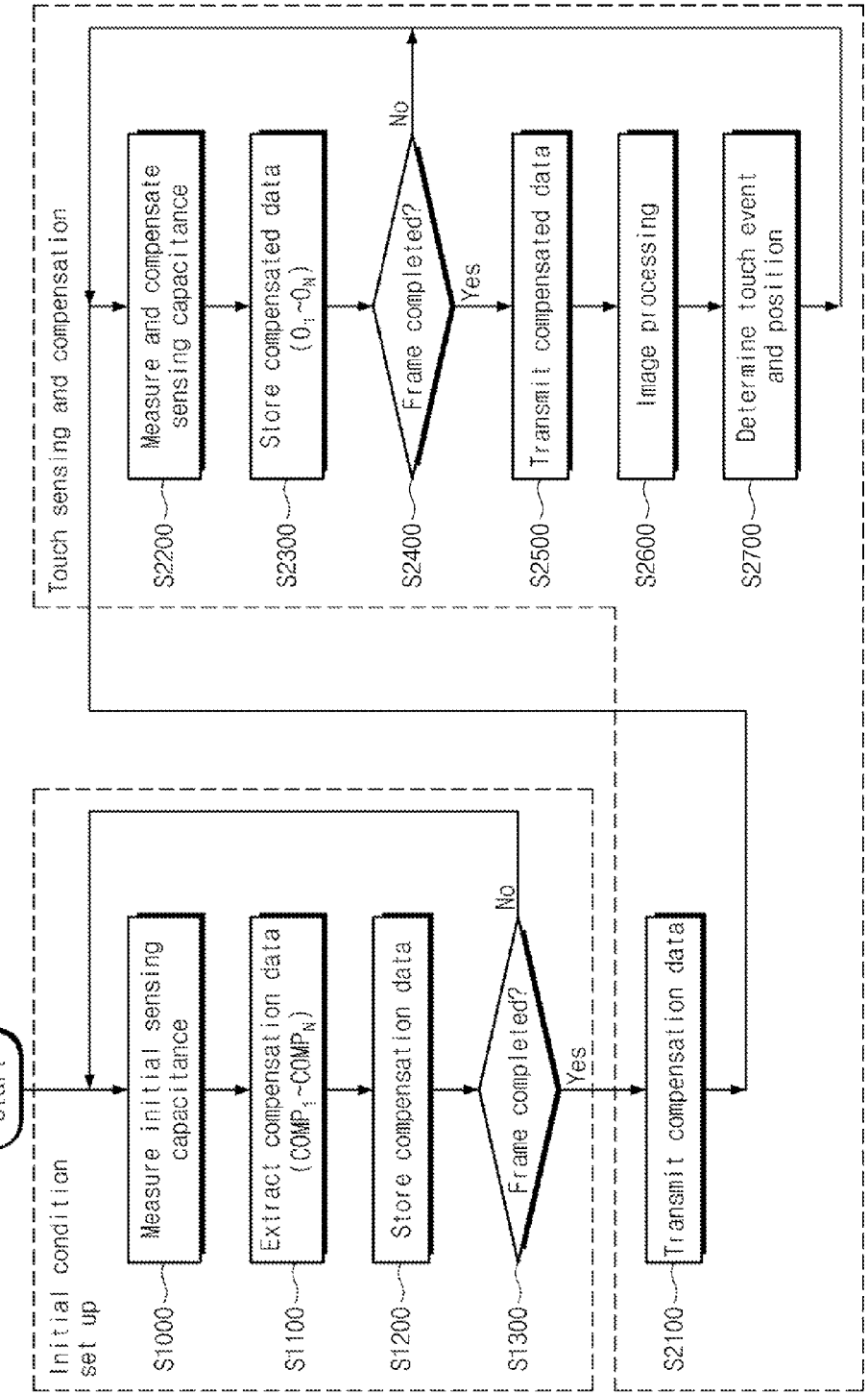
FIG. 4 is a flowchart illustrating a compensating method of sensing capacitance variations according to the present invention.

FIG. 4 is a flowchart illustrating a compensating method of sensing capacitance variations according to the present invention.

Referring to FIG. 4, the compensating method of sensing capacitance variations may be largely divided into a set up initial condition phase and a touch sensing compensation phase. The set up initial condition phase may be performed when the touch panel 10 is driven for the first time (i.e., initial operation) or environment is changed suddenly. Or, if touch does not occur on the touch panel 10 for a predetermined time or no operation is performed by the host processor 60 (i.e., idle time), the set up initial condition phase may be performed.

Operations in the set up initial condition phase are as follows.

First, an initial sensing capacitance $C_{INI}$ is measured through the input unit 20 in operation S1000. Here, the initial sensing capacitance $C_{INI}$ means that a value outputted from CAs when the touch panel is not touched. The measured initial sensing capacitor $C_{INI}$ may mean variations of the sensing capacitor $C_{SENSE}$ caused from manufacturing processes. A value of the measured initial sensing capacitance $C_{INI}$ may be provided to the ADC 40 through the MUX 30.

In operation S1100, the ADC 40 performs analog-to-digital conversion on the measured result of the initial sensing capacitance $C_{INI}$ measured in operation S1000 and extracts compensation data $COMP_1$ to $COMP_N$ from the analog-to-digital conversion result (i.e., $V_{COMP}$) of the measured result. In a preferred embodiment, the compensation data $COMP_1$ to $COMP_N$ may correspond to each bit of the analog-to-digital conversion result $C_{COMP}$ of the measured value of the initial sensing capacitance $C_{INI}$. Then, the extracted compensation data $COMP_1$ to $COMP_N$ are stored in the memory 65 in operation S1200. The compensation data $COMP_1$ to $COMP_N$ corresponding to an entire region or a partial region of the touch panel 10.

In operation S1300, it is determined whether a frame is completed or not. Here, the frame may mean an entire region of the touch panel 10 or a region of the touch panel 10 that will be applied to image processing. Based on the determination result in operation S1300, if the frame is not completed, a measuring operation about the initial sensing capacitance $C_{INI}$ and an extracting and storing operation of the compensation data $COMP_1$ to $COMP_N$ corresponding to the initial sensing capacitance $C_{INI}$ are repeatedly performed until frame completion.

The memory 65 may be equipped in the host processor 50 and or may be equipped outside the host processor 60. Moreover, the memory 65 may include a semiconductor memory such as a register, a flip-flop, an EEPROM and so forth. Configuration of the memory 65 and a storage method of the compensation data $COMP_1$ to $COMP_N$ stored in the memory 65 are not limited to specific forms and may vary.

Once a set up initial condition phase ends, a touch sensing and compensation phase may begin. The touch sensing and compensation phase may mean that the touch panel 10 operates normally. Therefore, an operation performed during the touch sensing and compensation phase may repeat at any time without limitation to the number of executions.

An operation performed in the touch sensing and compensation phase is as follows.

First, once a touch sensing and compensation phase begins, the compensation data stored in the set up initial condition phase may be provided from the memory 65 to the ADC 40 in operation S2100. In operation S2200, a sensing capacitance $C_{SENSE}$ is measured through the input unit 20 and the MUX 30 and variations of the sensing capacitance $C_{SENSE}$ caused from manufacturing processes are compensated by using the provided compensation data in operation S2100.

In a preferred embodiment, an operation for compensating for variations of the sensing capacitance $C_{SENSE}$ may be performed by the ADC 40. For example, the ADC 40 may be configured to output differences (i.e., variation compensation results) between the sensing capacitance $C_{SENSE}$ and the initial sensing capacitance $C_{INI}$ when converting the sensing capacitance $C_{SENSE}$ provided from the MUX 30 into digital data. For example, a value of the sensing capacitance $C_{SENSE}$ provided from the MUX 30 may include variations of the sensing capacitance $C_{SENSE}$ caused from manufacturing processes. Moreover, the initial sensing capacitance $C_{INI}$ may correspond to the variations themselves of the sensing capacitance $C_{SENSE}$ caused from manufacturing processes. Therefore, without passing through additional operation processes, the compensation data $COMP_1$ to $COMP_N$ extracted from the measurement value of the initial sensing capacitance $C_{INI}$ is directly reflected as an offset of the ADC 40. Accordingly, the compensation of the sensing capacitance variations, caused from manufacturing processes, and analog-to-digital conversion may be simultaneously performed.

For example, during a sampling process for converting the sensing capacitance $C_{SENSE}$ into digital data, the ADC 40 may perform sampling on the sensing capacitance $C_{SENSE}$ and additionally perform sampling on the compensation data $COMP_1$ to $COMP_N$ corresponding to the sensing capacitance $C_{SENSE}$. The sampling result of the compensation data $COMP_1$ to $COMP_N$ that are additionally reflected during the sampling process may be provided to the inverting input (−) of the comparator 420 in addition to the sampling result of the sensing capacitance $C_{SENSE}$ during a data conversion phase. In this case, the compensation data $COMP_1$ to $COMP_N$ may be reflected as an offset of the ADC 40.

According to this configuration, an output of the comparator 420 outputted from the data conversion phase becomes the same as the result of subtracting the initial sensing capacitance $C_{INI}$ from the sensing capacitance $C_{SENSE}$. This means that the comparator 420 outputs output data where manufacturing process variations of the sensing capacitance $C_{SENSE}$ are compensated. That is, if the compensation data $COMP_1$ to $COMP_N$ are reflected as an offset of the ADC 40, an additional operation for obtaining differences between the sensing capacitance $C_{SENSE}$ and the initial sensing capacitance $C_{INI}$ for compensating variations are not required. Accordingly, circuit configuration becomes simpler, and variations of the sensing capacitance $C_{SENSE}$ caused from manufacturing processes may be compensated.

The compensation results for the variations of the sensing capacitance $C_{SENSE}$ may be outputted as the output data $O_1$ to $O_N$ of the ADC 40 and then stored in operation S2300. The compensation result may be stored in the memory 65 of the host processor 60 and may be stored in other equivalent devices.

Next, it is determined in operation S2400 whether a frame is completed or not. Based on the determination result in operation S2400, if the frame is not completed, operation S2100 to S2300 are repeatedly performed until the frame is finished. Moreover, based on the determination result in operation S2400, if the frame is terminated, compensation results for the variations are provided to the core 61 of the host processor 60 in operation S2500. The compensation results for the variations provided to the core 61 may correspond to one frame. In operation S2600, the core 61 performs image processing on the compensation results for the variations. Then, in operation S2700, according to the image processing result of the core 61, it is determined that which position and how a touch event and a gesture occur. The above described operations of operation S2100 to S2700 (i.e., operations of a touch sensing and compensation phase) may be repeated without limitation to the number times each time the screen pad 10 is touched during a normal operation.

Figure 5:
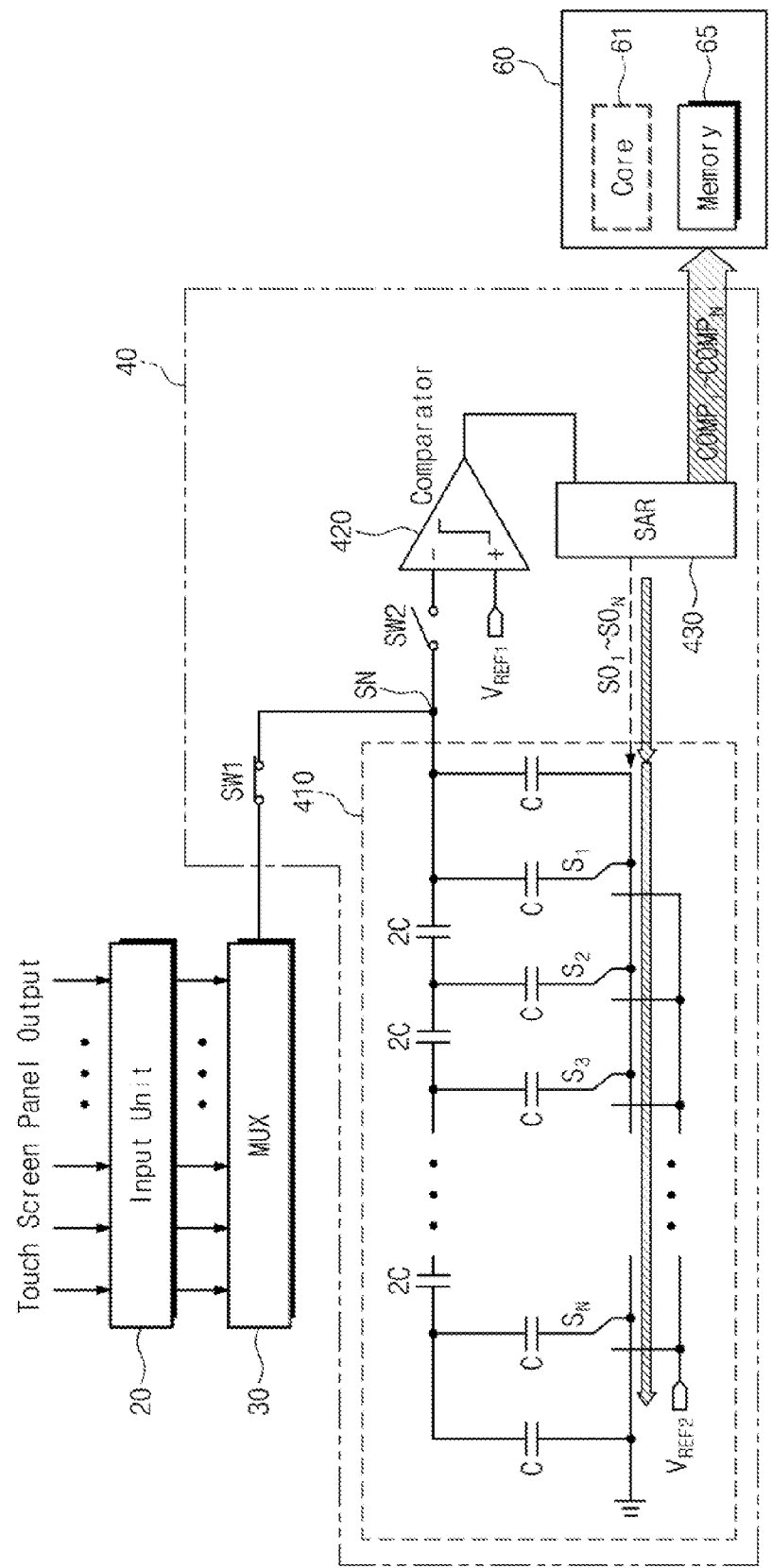
FIG. 5 is a view illustrating a measuring method of an initial sensing capacitance $C_{INI}$ performed at the set up initial condition phase of FIG. 4 and extracting and storing methods of the compensation data $COMP_1$ to $COMP_N$.

FIG. 5 is a view illustrating a measuring method of an initial sensing capacitance $C_{INI}$ performed at the set up initial condition phase of FIG. 4 and extracting and storing methods of the compensation data $COMP_1$ to $COMP_N$.

Referring to FIG. 5, when a driving line is activated and the touch panel is not touched, an initial sensing capacitance $C_{INI}$ is measured through CAs in the input unit 20. The measured result of the initial sensing capacitance $C_{INI}$ measured through the input unit 20 may be serialized through the MUX and then sequentially provided to the ADC 40.

The ADC 40 includes various operations that are largely divided into a sampling phase and a data conversion phase.

In a case of the set up initial condition phase, all capacitors corresponding to the MSB to LSB in the capacitor array 410 may be connected to a ground before a sampling operation starts. In this state, if the first switch SW1 is turned on (i.e., close), a sampling operation starts. The capacitor array 410 performs sampling on the measured result of the initial sensing capacitance $C_{INI}$ during a sampling phase. During a sampling operation, the second switch SW2 maintains a turn off (i.e., open) state.

Next, when the first switch SW1 is turned off (i.e., open) and the second switch SW2 is turned on (i.e., close), a data conversion phase begins. Once the data conversion phase begins, the SAR logic 430 sequentially generates scan signal $SO_1$ to $SO_N$ to set a plurality of bits (e.g., N bit) of the MSB to LSB. In response to the scan signals $SO_1$ to $SO_N$ generated from the SAR logic 430, the capacitor array 410 sequentially connects charge switches $S_1$ to $S_N$, which correspond to the MSB to LSB, from the ground to the reference voltage $V_{REF2}$. Due to that the charge switches S1 to SN sequentially connect to from the ground to the reference voltage $V_{REF2}$, the sampling results of the MSB to LSB of the measured initial sensing capacitance $C_{INI}$ are sequentially provided to the comparator 420. Each sampling result corresponding to the MSB to LSB is inputted to the inverting input (−) of the comparator 420 and the reference voltage $V_{REF1}$ is inputted to the non-inverting input (+) of the comparator 420.

The comparator 420 compares the sampling result corresponding to the MSB to LSB of the initial sensing capacitance $C_{INI}$ with the reference voltage $V_{RER1}$, and then determines each of the MSB and LSB value of the measured result of the initial sensing capacitance $C_{INI}$ as digital data of 0 or 1. Each bit value determined by the comparator 420 is stored in the memory 65 of the host processor as the compensation data $COMP_1$ to $COMP_2$ through the SAR logic 640.

As mentioned above, a measuring method of the initial sensing capacitance $C_{INI}$ performed at a set up initial condition phase and extracting and storing methods of the compensation data $COMP_1$ to $COMP_N$ are described. However, this is just one example applied to the present invention and during an idle time that touch does not occur on the touch panel 10 for a predetermined time or no operation is performed by the host processor 60, a measuring operation of the initial sensing capacitance $C_{INI}$ and extracting and compensating operations of the compensation data $COMP_1$ to $COMP_N$ may be performed. According to this configuration, an environmental change is immediately reflected on the compensation data $COMP_1$ to $COMP_N$.

Referring to FIGS. 6 through 10, a process variation compensation operation of the sensing capacitance $C_{SENSE}$ performed during a touch sensing and compensation interval shown in FIG. 4 may be described.

In one embodiment, the variation compensation operation of the sensing capacitance $C_{SENSE}$ may be performed in the ADC 40. During the touch sensing and compensation phase, the operation in the ADC 40 may be divided into a sampling phase and a data converting operation.

During a sampling operation, the compensation data $COMP_1$ to $COMP_N$ stored in the memory 65 may be reflected as an offset value of the sampling data before the sensing capacitance $C_{SENSE}$ is sampled. While the initial sensing capacitance $C_{INI}$ is reflected as an offset, the sampling result of the sampled sensing capacitance $C_{SENSE}$ is compared with a predetermined reference voltage $V_{REF1}$ during a data conversion phase. Moreover, based on the comparison result, N-bit digital data with a 0 or 1 value may be generated as analog-to-digital conversion result. Accordingly, without an additional operation for adding or subtracting a difference between the sensing capacitance $C_{SENSE}$ and the initial sensing capacitance $C_{INI}$ (i.e., compensation data $COMP_1$ to $COMP_N$), the manufacturing process variations of the sensing capacitance ($C_{SENSE}$) may be compensated.

Figure 6:
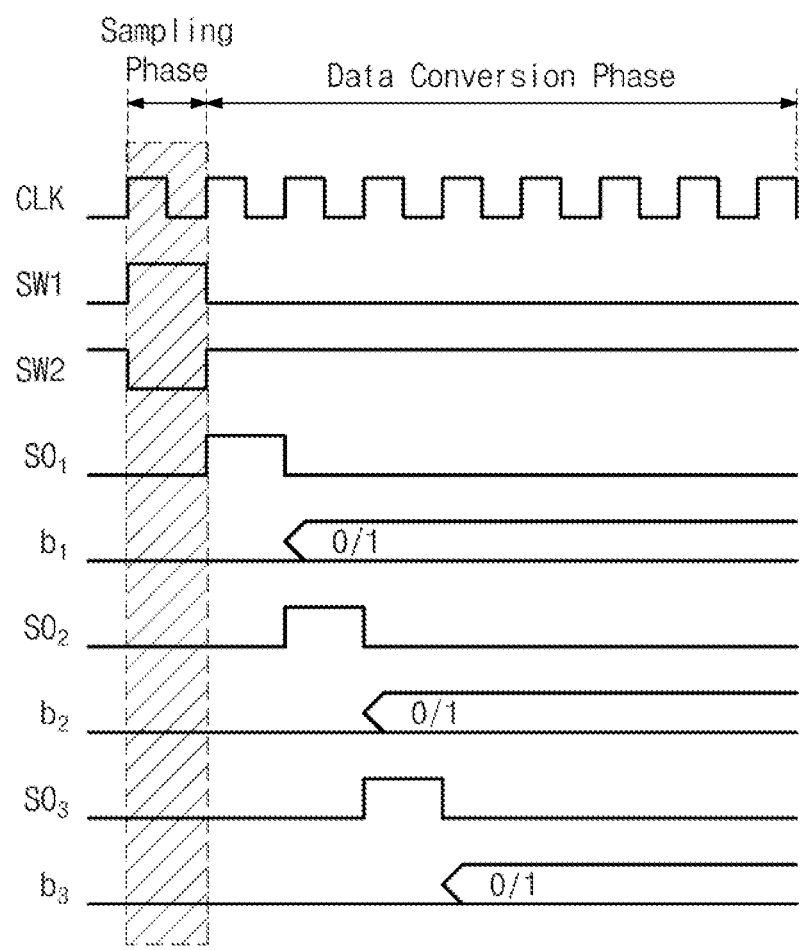
FIGS. 6 and 7 are views illustrating a sampling operation of the ADC performed at a touch sensing and compensation phase according to the present invention.
Figure 7:
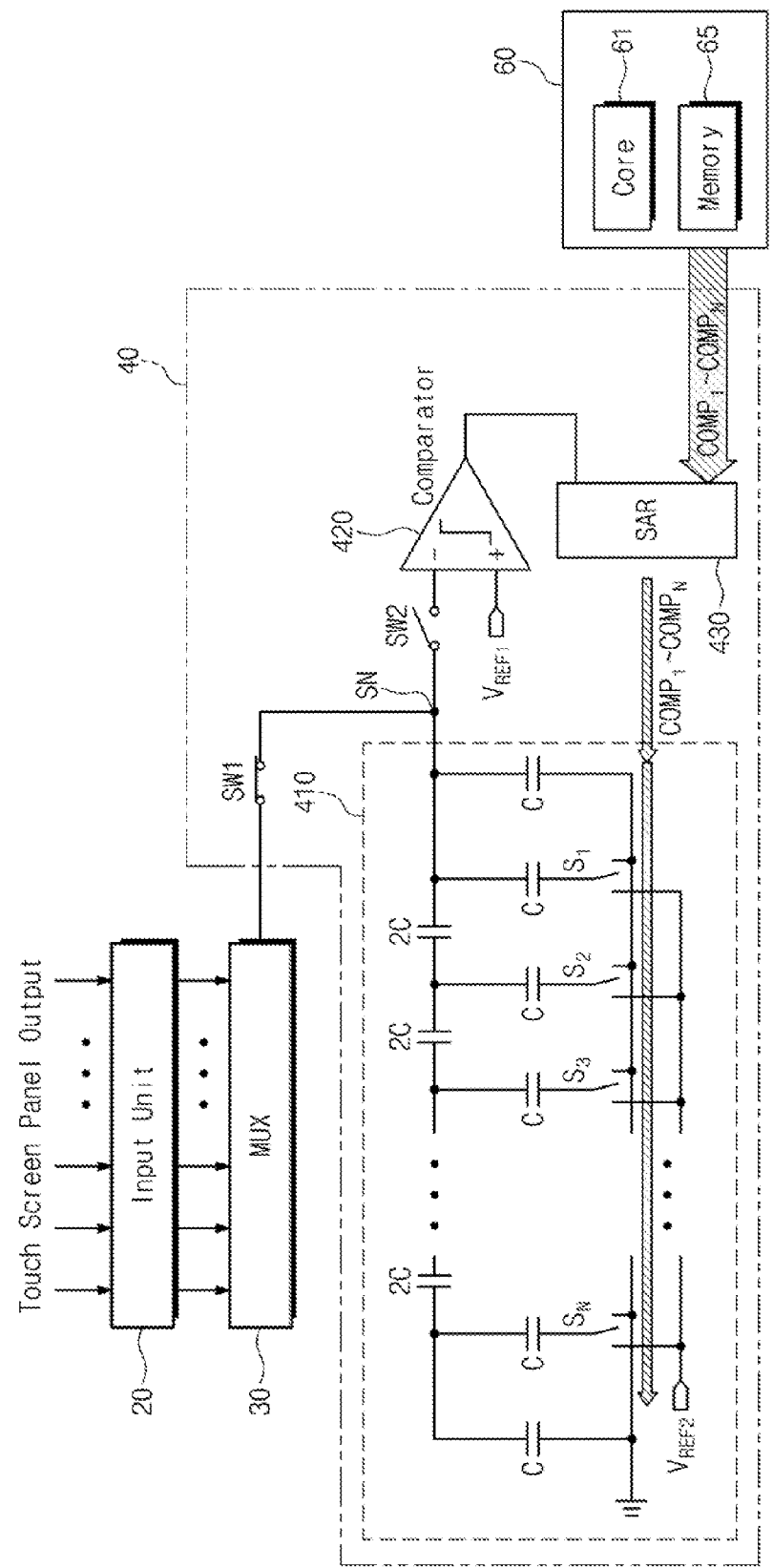

FIGS. 6 and 7 are views illustrating a sampling operation of the ADC 40 performed at a touch sensing and compensation phase according to the present invention. An operation timing of the ADC 40 for performing a sampling operation is illustrated in FIG. 6. Moreover, a data flow (see a slash portion) of the compensation data $COMP_1$ to $COMP_N$ provided to the ADC during a sampling operation is illustrated in FIG. 7.

Referring to FIGS. 6 and 7, at the touch sensing and compensation phase, capacitors corresponding to the MSB to LSB in the capacitor array 410 may be selectively connected to a ground or a reference voltage $V_{REF2}$ by the compensation data $COMP_1$ to $COMP_N$ provided from the SAR logic 430 before the sensing capacitance $C_{SENSE}$ is sampled. Here, the compensation data $COMP_1$ to $COMP_N$ may be provided from the memory 65 to the capacitor array 410 of the ADC 40 through the SAR logic 43 as shown in FIG. 7. As a result, the compensation data $COMP_1$ to $COMP_N$ may be reflected as an offset value during a sampling operation of the sensing capacitance $C_{SENSE}$.

During this state, when a sampling operation starts by turning on (i.e., close) the first switch SW1, the capacitor array 410 may perform sampling on the sensing capacitance $C_{SENSE}$ (i.e., a touch panel sensing signal) provided from the MUX 30. During a sampling operation, the second switch SW2 maintains a turn-off (i.e., open) state. Capacitance (i.e., a sampling capacitance Cs) that is sampled in the capacitor array 410 during a sampling phase may be determined by the sensing capacitance $C_{SENSE}$ provided from the MUX 30 and the compensation data $COMP_1$ to $COMP_N$ corresponding to the initial sensing capacitance $C_{INI}$.

A voltage corresponding to a difference ($V_{REF1}-V_{COMP}$) between a reference voltage and a compensation voltage may be sampled in the capacitor array 410 during a sampling phase. The $V_{COMP}$ is a compensation voltage corresponding to an initial sensing capacitance $C_{INI}$ and is expressed as the following [Equation 2]

$$V_{COMP} = V_{REF}\left(\frac{1}{2}COMP_1 + \frac{1}{2^2}COMP_2 + \ldots + \frac{1}{2^{10}}COMP_{10}\right) \quad \text{[Equation 2]}$$

where $COMP_1$ is an MSB of a compensation voltage $V_{COMP}$, and $COMP_{10}$ is an LSB of a compensation voltage $V_{COMP}$.

Figure 8:
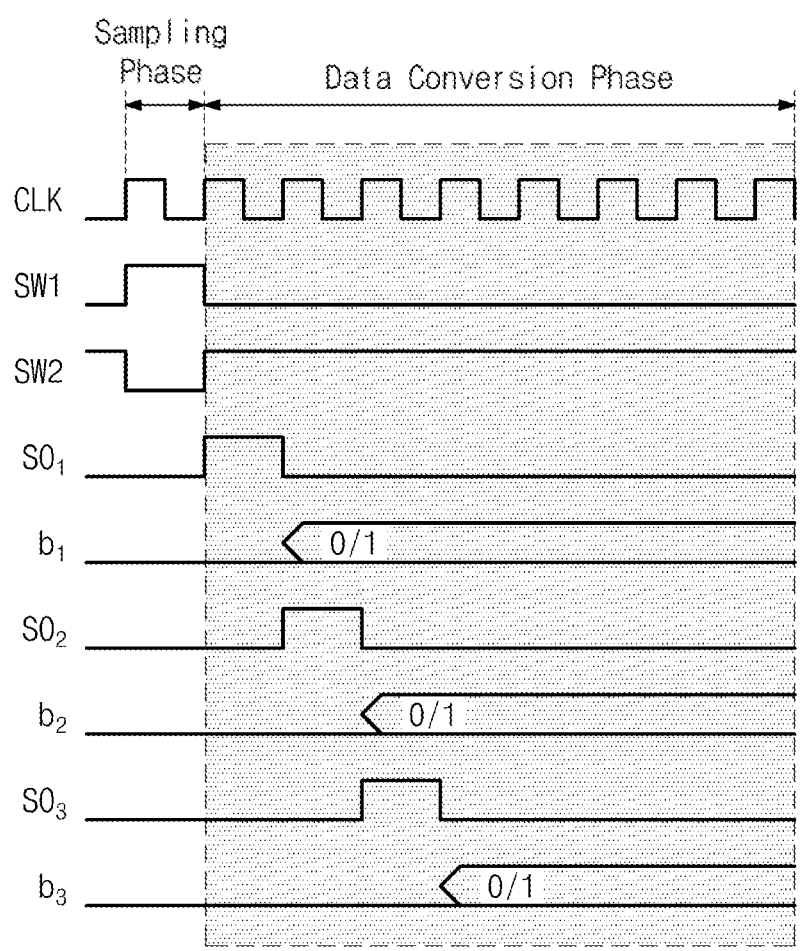
FIGS. 8 and 9 are views illustrating a data conversion operation of the ADC and a variation compensating operation at a touch sensing and compensation phase according to the present invention.
Figure 9:
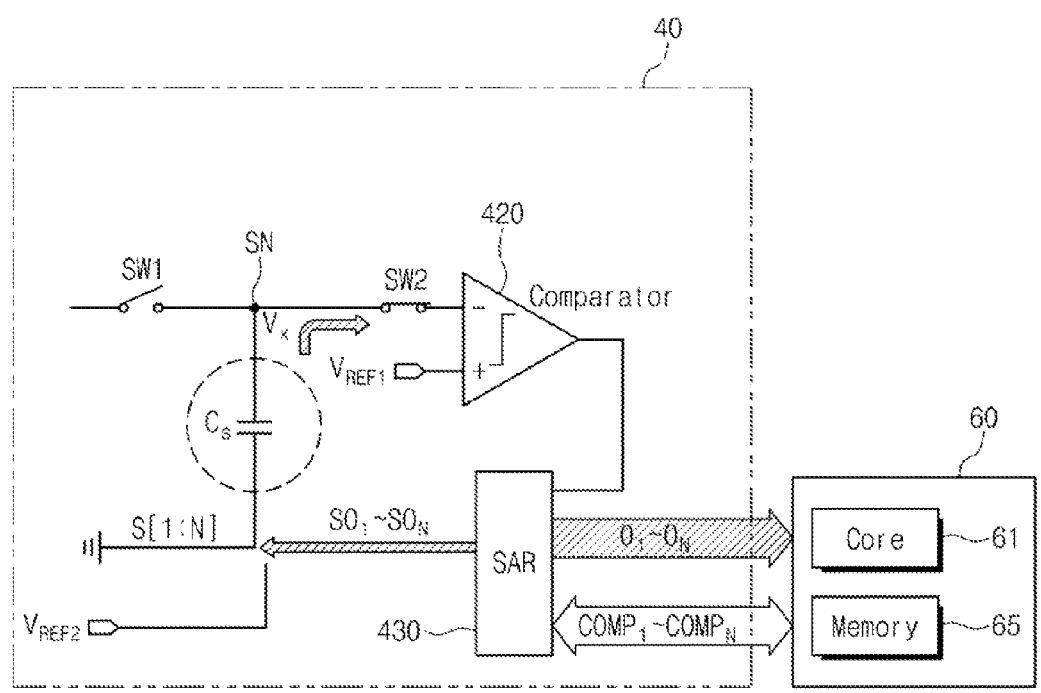

FIGS. 8 and 9 are views illustrating a data conversion operation of the ADC 40 and a variation compensating operation at a touch sensing and compensation phase according to the present invention. An operation timing of the ADC 40 for performing a data conversion operation is illustrated in FIG. 8. Moreover, a data flow (see slash portion) for generating an analog-to-data conversion result (i.e., compensated data $O_1$ to $O_N$) outputted from the ADC 40 during a data conversion operation is illustrated in FIG. 9.

Referring to FIGS. 8 and 9, after a sampling operation is performed in the capacitor array 410, the first witch SW1 is turned off (i.e., open) and the second switch SW2 is turned on (i.e., close) and then a data conversion phase starts.

Once the data conversion phase starts, the SAR logic 430 sequentially generates scan signals $SO_1$ to $SO_N$ for setting a plurality of bits (for example, N bit) of the MSB to LSB. The capacitor array 410 sequentially connects the charge switches S1 to SN corresponding to the MSB to LSB to from the ground to the reference voltage $V_{REF2}$ in response to the scan signals $SO_1$ to $SO_N$ generated from the SAR logic 430. By sequentially connecting the charge switches S1 to SN to from the ground to the reference voltage $V_{RF2}$, a sampling result of the sensing capacitance $C_{SENSE}$ where an initial sensing capacitance $C_{INI}$ is reflected as an offset value is provided to the comparator 420 from the MSB to LSB.

Each sampling result corresponding to the MSB to LSB is inputted to the inverting input (−) of the comparator 420 and a reference voltage $V_{REF1}$ is inputted to the non-inverting input (+) of the comparator 420. The comparator 420 compares each sampling result corresponding to the MSB to LSB with the reference voltage $V_{REF1}$, and then outputs a comparison result in digital data $O_1$ to $O_N$. Therefore, the analog-to-digital conversion result $O_1$ to $O_N$ of the ADC 40 correspond to the result where variations of the sensing capacitance $C_{SENSE}$ caused from manufacturing processes are compensated.

Figure 10:
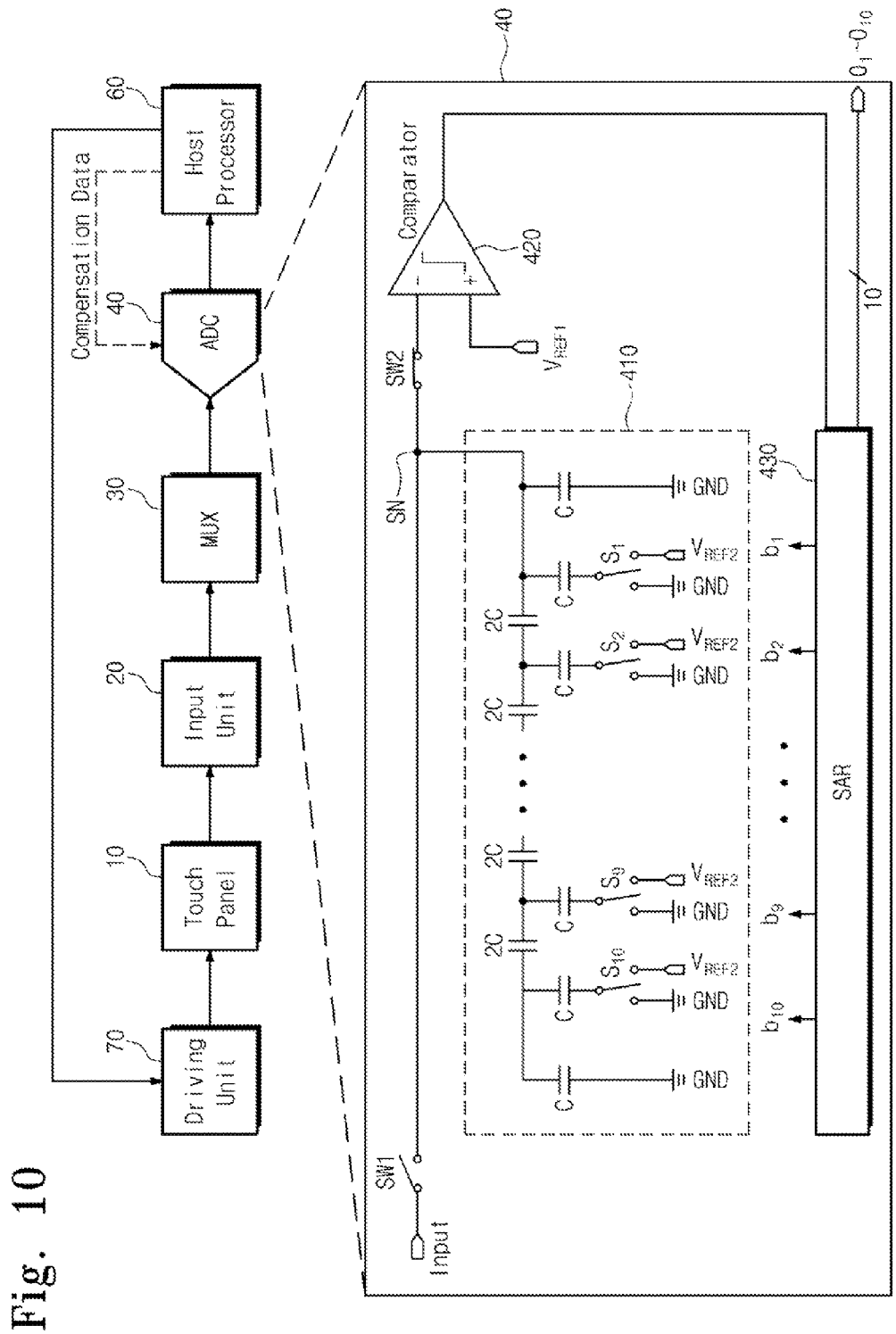
FIG. 10 is a view illustrating a data conversion operation and variation compensating operation of the ADC of FIG. 9.

FIG. 10 is a view illustrating a data conversion operation and variation compensating operation of the ADC 40 of FIG. 9. An entire configuration of the touch screen and a detailed configuration of the ADC 40 with resolution of 10 are illustrated in FIG. 10.

In FIG. 10, the host processor 60 may provide compensation data $COMP_1$ to $COMP_N$ to the ADC 40 to compensate the variations of the sensing capacitance $C_{SENSE}$. However, since the compensation data $COMP_1$ to $COMP_N$ may be provided at a sampling phase, a view for illustrating a data conversion operation is not specifically shown in FIG. 10. Instead of that, the compensation data $COMP_1$ to $COMP_N$ are specifically illustrated in FIG. 7 for describing a sampling operation.

In FIG. 10, $b_1$ to $b_{10}$ provided from SAR logic 430 to the capacitor array 410 may mean an initial value (i.e., an initial digital bit) of an analog-to-digital conversion result outputted from the ADC 40. When an analog signal starts to be applied, $b_1$ to $b_{10}$ may be generated from the SAR logic 430 as an initial digital bit. Here, $b_1$ may represent the MSB of an analog-to-digital conversion result outputted from the ADC 40 and $b10$ may represent the LSB of an analog-to-digital conversion result outputted from the ADC 40

Referring to FIGS. 8 to 10, a first scan signal $SO_1$ generated from the SAR logic 430 is activated to connect the switch S1 to from the ground 0V to the reference voltage VREF2, a voltage corresponding to $b_1$ provided to the inverting input (−) of the comparator 40 through the sampling node SN. The comparator 40 compares the voltage of the sampling node SN with the reference voltage $V_{REF1}$ provided to the non-inverting input (+) and then outputs a value $b_1$ as 0 or 1.

For example, let's assume that Vs is a sampling voltage that is sampled during a sampling phase, Vx is a voltage provided to the inverting input (−) of the comparator 420 through the sampling node SN at a conversion operation for an $i^{th}$ bit.

Based on the comparison result by the comparator 40, if Vx is greater than the reference voltage $V_{REF1}$, an output of the comparator 420 is logic low and $b_1$ becomes 0. In this case, the SAR logic 430 allows Vx to return to the sampling voltage $V_S$ by connecting to from the reference voltage VREF2 to the ground through the switch S1. Based on the comparison result of the comparator 420, if Vx is smaller than VV, an output of the comparator 420 becomes logic high and $b_1$ becomes 1. In this case, the SAR logic 430 maintains a state in which the switch SI is connected to the reference voltage $V_{REF2}$. Through above described manner, a value of the MSB of the analog-to-digital conversion result is determined. In the same manner, digital values with respect to a second bit to the last bit (LSB) of the analog-to-digital conversion result are sequentially determined In a conversion operation for an $i^{th}$ bit, a relation between the voltage $V_X$ provided to the inverting input (−) of the comparator 420 through the sampling node SN and the reference voltage VREF1 is expressed as the following [Equation 3].

$$V_{REF1} - V_{IN} = \frac{1}{3}V_{REF1}\left(\frac{1}{2^1}b_1 + \frac{1}{2^2}b_2 + \ldots + \frac{1}{2^{10}}b_{10}\right) \quad \text{[Equation 3]}$$

[Equation 3] represents an operation of SAR ADC during an initial setup condition phase. During the initial setup condition phase, $b_1$ to $b_N$ become $O_1$ to $O_N$ immediately. However, during a touch sensing and compensation phase, since Vin is changed by the compensation voltage $V_{COMP}$, [Equation 3] may be expressed as [Equation 4].

$$V_{REF1} - (V_{IN} - V_{COMP}) = \frac{1}{3}V_{REF1}\left(\frac{1}{2^1}O_1 + \frac{1}{2^2}O_2 + \ldots + \frac{1}{2^{10}}O_{10}\right)$$

[Equation 4] may be developed as [Equation 5]

$$V_{REF1} - V_{IN} = \frac{1}{3}V_{REF1}\left(\frac{1}{2^1}O_1 + \frac{1}{2^2}O_2 + \ldots + \frac{1}{2^{10}}O_{10}\right) - \quad \text{[Equation 5]}$$
$$\frac{1}{3}V_{REF1}\left(\frac{1}{2^1}COMP_1 + \frac{1}{2^2}COMP_2 + \ldots + \frac{1}{2^{10}}COMP_{10}\right).$$

Here, if a voltage value of an uncompensated arbitrary capacitor is $V_{REF}$-$V_{IN}$ and one bit number of a digital value corresponding thereto is $b_N$, a value $O_N$ compensated by the bit $COMP_N$ of a corresponding compensation voltage $V_{COMP}$ is expressed as the following [Equation 6].

$$O_n = b_n + COMP_n \quad \text{[Equation 6]}$$

Where, $$V_{REF1}\left(\frac{1}{2^1}COMP_1 + \frac{1}{2^2}COMP_2 + \ldots + \frac{1}{2^{10}}COMP_{10}\right)$$

corresponds to a compensation voltage $V_{COMP}$ obtained from the initial sensing capacitance $C_{INI}$. $V_X$ and $V_{COMP}$ are voltages to which the initial sensing capacitance $C_{INI}$ is applied. As we know from [Equation 3], variations of the sensing capacitance $C_{SENSE}$ caused from manufacturing processes may be compensated by $V_X$ and $V_{COMP}$ on which the initial sensing capacitance $C_{INI}$ is reflected.

According to the present invention, a difference between a current sensing capacitance and an initial sensing capacitance is extracted using data stored at initialization, and variations of the sensing capacitance caused from manufacturing processes and offset variations of an input unit of a controller may be compensated. In this case, since a compensating operation and a measuring operation are performed simultaneously, time for an additional compensating operation is not required. Thus, a response speed of a touch panel can be reduced.

Operations for compensating for variations of a sensing capacitance and offset variations of an input unit of a controller may be performed through the input unit 20 and the ADC 40 as shown in FIGS. 2 and 10. However, this is just one example applied to the present invention and thus variation compensating operations of the input unit 20 and the ADC 40 are not limited to specific embodiments and may vary. For example, variations may be compensated by using only the input unit 20 or the touch screen may be configured to compensate variations by using only the ADC 40. In addition, the touch screen may be configured to compensate variations of the sensing capacitance and offset variations of the input unit of the controller using both of the input unit and the ADC 40. Moreover, according to the variation compensation of the present invention, the offset DAC 50 of FIG. 2 may be selectively equipped in to adjust a reference voltage of the ADC 40.

Furthermore, the touch screen of the present invention may apply a SAR-ADC using an N-bit C-2C DAC to extract data for compensating for variations of the sensing capacitance. According to the above configuration, compared to SAR-ADC using a serial capacitor DAC, the touch screen of the present invention may require smaller area, effectively reduce sensing errors of the touch screen and accurately sense a touch event.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A touch screen comprising:
    a touch panel having a plurality of driving lines and a plurality of sensing lines intersecting with the plurality of driving lines, respectively;
    a driving unit configured to activate the driving lines sequentially;
    an input unit configured to measure a sensing capacitance formed in a sensing line corresponding to an activated driving line;
    a multiplexer configured to sequentially output the measured sensing capacitance;
    an analog-to-digital converter configured to sample the measured sensing capacitance outputted from the multiplexer using an initial sensing capacitance as an offset and perform analog-to-digital conversion on the sampling result; and
    a host processor configured to determine a touch event in response to the analog-to-digital conversion result,
    wherein the analog-to-digital conversion result corresponds to a difference between the measured sensing capacitance and the initial sensing capacitance.

2. The touch screen of claim 1, wherein the initial sensing capacitance is measured when the touch panel is not touched.

3. The touch screen of claim 1, wherein the analog-to-digital converter comprises:
    a first switch configured to provide the measured sensing capacitance outputted from the multiplexer into a capacitor array at a sampling phase;
    the capacitor array including a plurality of capacitors and configured to sample the measured sensing capacitance at the sampling phase after the plurality of capacitors are selectively connected to a ground or a first reference voltage by the initial sensing capacitance;
    a Successive Approximation Register (SAR) logic configured to control providing the initial sensing capacitance to the capacitor array and output the sampling result of the capacitor array by a bit unit at a digital conversion phase;
    a comparator configured to output digital data of a bit unit by receiving the sampling result by a bit unit at the digital conversion phase; and
    a second switch configured to provide the sampling result from the capacitor array to the comparator at the digital conversion phase.

4. The touch screen of claim 3, wherein the capacitor array samples a voltage corresponding to a difference between a second reference voltage and a compensation voltage, the compensation voltage corresponding to the initial sensing capacitance.

5. The touch screen of claim 4, wherein when the second reference voltage is $V_{REF}$ and bits of the initial sensing capacitance are $COMP_1, COMP_2, \ldots,$ and $COMP_N$, respectively, the compensation voltage $V_{COMP}$ is determined as follows:

$$V_{COMP} = V_{REF}\left(\frac{1}{2}COMP_1 + \frac{1}{2^2}COMP_2 + \ldots + \frac{1}{2^{10}}COMP_{10}\right),$$

wherein N is a positive integer and corresponds to a resolution of the analog-to-digital converter.

6. The touch screen of claim 3, wherein the host processor comprises a memory for storing the initial sensing capacitance and the initial sensing capacitance is provided from the memory to the capacitor array before the sampling phase begins.

7. The touch screen of claim 1, wherein the input unit comprises a plurality of charge amplifiers for converting the measured sensing capacitance into a voltage and each of the plurality of charge amplifiers comprises at least one feedback capacitor.

8. The touch screen of claim 7, wherein in order to adjust gains of the plurality of charge amplifiers, the feedback capacitor is implemented with a programmable capacitor array to compensate a sensing capacitor by a control of the host processor.

9. The touch screen of claim 7, in order to compensate offset variations of the plurality of charge amplifiers, further comprising an offset digital-to-analog converter for adjusting a level of a reference voltage of the analog-to-digital converter by a control of the host processor.

10. A method for compensating for sensing capacitance variations and offset variations of a touch screen, the method comprising:
storing first data measured from a sensing capacitor when the touch screen is not touched; and
converting second data measured from the sensing capacitor when the touch panel is touched into digital data,
wherein the first data is used to adjust a level of a sampling voltage of the second data when the second data is converted into the digital data,
wherein the digital data corresponds to a difference between the first data and the second data,
wherein the converting of the second data into the digital data comprises:
selectively connecting a plurality of capacitors of a capacitor array to a ground or a first reference voltage based on the first data;
sampling the second data in the capacitor array; and
converting the sampling result into N-bit digital data, N being a positive integer, and
wherein the converting of the sampling result into the N-bit digital data comprises:
sequentially generating N scan signals corresponding to bits of the N-bit digital data, respectively;
sequentially inputting voltages corresponding to the bits of the N-bit digital data, respectively, among the sampling result into a comparator; and
determining each of the bits of the N-bit digital data by comparing a voltage inputted into the comparator with a second reference voltage.

11. The method of claimer 10, wherein the sampling result is inputted into an inverting input of the comparator.

12. The method of claim 10, wherein the capacitor array samples a voltage corresponding to a difference between the second reference voltage and a compensation voltage, the compensation voltage corresponding to the first data.

13. The method of claim 12, wherein when the second reference voltage is $V_{REF}$ and bits of the first data are $COMP_1$, $COMP_2$, ..., and $COMP_N$, respectively, the compensation voltage $V_{COMP}$ is determined as follows:

$$V_{COMP} = V_{REF}\left(\frac{1}{2}COMP_1 + \frac{1}{2^2}COMP_2 + \ldots + \frac{1}{2^{10}}COMP_{10}\right).$$

14. The method of claim 12, wherein a level of the compensation voltage is adjusted according to the first data.

15. The method of claim 10, wherein the storing of the first data is performed when an initial operation, in which the touch panel is driven for the first time, is performed or environment is changed.

16. The method of claim 10, before converting the second data into the digital data, further comprising compensating for an offset of a charge amplifier for measuring the second data from the sensing capacitor,
wherein the charge amplifier comprises a programmable feedback capacitor.

17. The touch screen of claim 5, wherein N is 10.

18. The method of claim 13, wherein N is 10.

19. A method for compensating for sensing capacitance variations and offset variations of a touch screen, the method comprising:
storing first data measured from a sensing capacitor when the touch screen is not touched; and
converting second data measured from the sensing capacitor when the touch panel is touched into digital data,
wherein the first data is used to adjust a level of a sampling voltage of the second data when the second data is converted into the digital data,
wherein the digital data corresponds to a difference between the first data and the second data,
wherein the converting of the second data into the digital data comprises:
selectively connecting a plurality of capacitors of a capacitor array to a ground or a first reference voltage based on the first data;
sampling the second data in the capacitor array; and
converting the sampling result into N-bit digital data, N being a positive integer,
wherein the capacitor array samples a voltage corresponding to a difference between a second reference voltage and a compensation voltage, the compensation voltage corresponding to the first data, and
wherein when the second reference voltage is $V_{REF}$ and bits of the first data are $COMP_1$, $COMP_2$, ..., and $COMP_N$, respectively, the compensation voltage $V_{COMP}$ is determined as follows:

$$V_{COMP} = V_{REF}\left(\frac{1}{2}COMP_1 + \frac{1}{2^2}COMP_2 + \ldots + \frac{1}{2^N}COMP_N\right).$$

20. The method of claim 19, wherein the converting of the sampling result into the N-bit digital data comprises:
sequentially generating N scan signals corresponding to bits of the N-bit digital data, respectively;
sequentially inputting voltages corresponding to the bits of the N-bit digital data, respectively, among the sampling result into a comparator; and
determining each of the bits of the N-bit digital data by comparing a voltage inputted into the comparator with the second reference voltage.

* * * * *